July 20, 1926.
A. WILD
LUBRICATING DEVICE
Filed Dec. 3, 1923
1,592,997
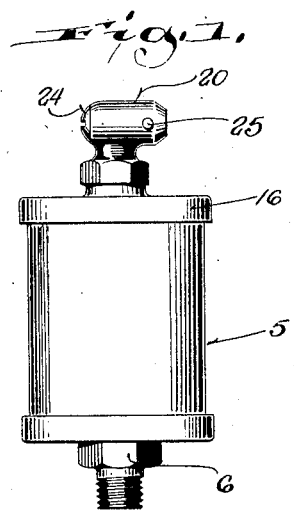
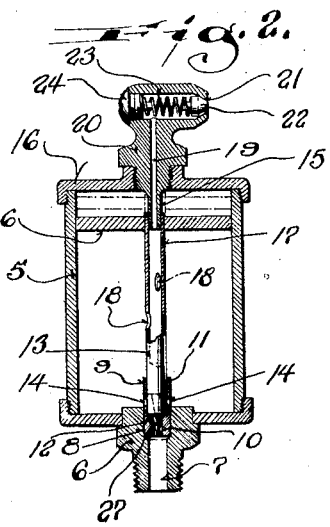
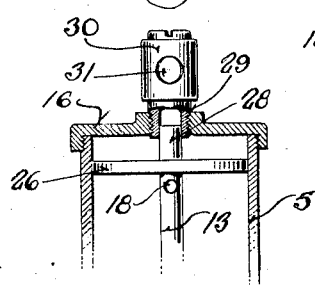
Inventor,
Alfred Wild
By Ira M. Jones.
Attorney Patented July 20, 1926.

1,592,997

UNITED STATES PATENT OFFICE.

ALFRED WILD, OF MILWAUKEE, WISCONSIN.

LUBRICATING DEVICE.

Application filed December 3, 1923. Serial No. 678,289.

This invention relates to certain new and useful improvements in lubricating devices and refers more particularly to a device for supplying bearings with liquid lubricant, such as oil and the like.

Three general types of devices are employed for lubricating bearings; one, using grease which is supplied the bearing either by means of a compression cup, or a force feed or pump system; another providing an opening into which liquid lubricant may be introduced by a can or other means; and the other an oil cup or reservoir from which a candle wick leads to the bearing.

These devices, while functioning after a manner, are objectionable in many ways. The use of grease for bearings is objectionable in that after the grease has been forced around the bearing further lubricant is not supplied until additional pressure is brought to bear. Oiling a bearing by means of an oil can is objectionable in that no reserve is carried and, in the case of automotive vehicles, experience has demonstrated that in washing the vehicle, water gets into the oil passage and, being heavier than oil, settles therein and prevents further lubricating of the bearing. As to the reservoir type in which a candle wick is provided, the oil is continuously fed to the bearing whether the shaft journaled therein is in motion or stationary, causing a loss, resulting in continued dripping which is objectionable and to be avoided at all times, and requiring a too frequent replenishing of the reservoir.

Having the above and other objections to the present types of lubricating devices in mind, this invention has for one of its objects to provide a lubricating device carrying a reserve supply of lubricant which is supplied the bearing only when the shaft journaled therein is in motion.

Another object of this invention resides in the provision of a lubricating device of the character described in which vibration incidental to the operation of the shaft journaled in the bearing to be lubricated or of the frame mounting the bearing causes the lubricant to be supplied the bearing, the passage of lubricant from the reservoir to the bearing being cut off when the shaft journaled therein is stationary or the frame is motionless.

A further object of this invention resides in the provision of a lubricating device of the character described wherein the lubricant may be supplied to the reservoir and then upon the application of pressure thereto forced to the bearing after the reservoir has been filled a predetermined degree, the passage of fluid from the reservoir to the bearing being instantly cut off upon the release of pressure.

A still further object of this invention resides in the provision of a lubricating device of the character described having a reservoir provided with an outlet and a valve normally closing the outlet and movable to and from closed position by vibration to permit the flow of lubricant from the reservoir through the outlet, said valve member being preferably provided with means for cleaning the outlet opening.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:—

Figure 1 is a side elevational view of a lubricating device embodying my invention;

Figure 2 is a vertical sectional view taken through my device, the lower portion of the valve member being shown in elevation, and Figure 3 is a view, partly in section and partly in elevation, of the upper portion of a slightly modified form of lubricating device embodying my invention.

Referring now more particularly to the accompanying drawing, in which like numerals designate like parts throughout the several views; numeral 5 designates a cylinder or reservoir which may be of any desired construction and has a coupling member 6 extended from its bottom wall for connecting the device with the bearing, not shown, to be lubricated. The coupling 6 has a central bore 7 extended therethrough and communicating with the interior of the reservoir to provide a lubricant outlet and the upper or inner end of said bore is preferably counterbored, as at 8, to receive a sleeve 9, the bore 10 of the lower portion of which is of less diameter than the bore 11 of the upper portion thereof to provide a valve seat 12 with which the lower end of a valve member 13 is engageable to close the outlet.

The valve member 13 is guided for free vertical movement in the reservoir to engage and disengage its lower end with seat 12, the movement of said valve member being less than the depth of bore 11. Formed in the walls of sleeve 9 and communicating with bore 11 at a point adjacent seat 12 are one or more openings 14, so that when the valve member is in an upper-most position free of said openings, lubricant will flow from the interior of the reservoir through outlet 7 to the bearing, not shown, to be lubricated. As best shown in Figure 2, the openings 14, being on a higher plane that the bottom of the reservoir, provide a dirt trap in which foreign matter carried by the lubricant settles to prevent its passage through the outlet to the bearing being lubricated.

Various means may be provided for maintaining the valve member for free vertical movement and in Figure 2 this means is illustrated as a tubular guide pin 15 which is extended centrally into the reservoir from a cap or cover 16, closing the top thereof, and is telescopically received in the upper tubular end 17 of the valve member. The valve member is thus guided by the pin 15 and the sleeve 9.

As clearly illustrated in Figure 2, the valve member is tubular from its upper-most end to a point adjacent its lower-most end and openings 18 connect the interior of the valve member with the reservoir so that lubricant may be supplied the reservoir through the bore 19 of the pin 15, the interior of the valve member and the openings 18. In that embodiment illustrated in Figures 1 and 2, the member 15 is formed on a plug 20 carried by cap 16 and having its upper end provided with an inlet opening 21. The inlet is normally closed by a tapered valve member 22 which is normally urged to closed position by a spring 23 confined between the valve 22 and a removable screw or plug 24. The plug 20 is provided with one or more pins or projections 25 adjacent its inlet opening with which one end of a lubricant force feed pump or other device may be engaged so that in the event it is desired to employ a forced feed system, the supply device is connected therewith and the lubricant pumped into the reservoir 5. The lower-most opening 18 is disposed above the bottom of the bore of the tubular stem 17 to provide a safe-guard or trap against the entrance of foreign matter into the reservoir with the lubricant, such foreign matter or dirt settling in the bottom of the bore as will be readily apparent.

If it is desired to force the lubricant from the reservoir 5 to the bearing, not shown, lubricant is supplied the reservoir under pressure and after the lubricant within the reservoir reaches a disc or piston head 26 on the upper end of the valve, and preferably having a loose fit in the reservoir, the pressure raises the piston and consequently the valve member, forcing the lubricant through the outlet to the bearing. When the pressure is released, spring 23 closes valve 22 and the force of gravity returns valve 13 to closed position.

The reservoir is normally disconnected from the bearing, not shown, except when, due to vibration, the valve member is raised to its dotted line position illustrated in Figure 2 and in order to prevent clogging of the outlet opening at its restricted point 10, the lower end of the valve member carries a needle point 27, the operation of which will be readily apparent.

Divers devices may be constructed embodying the spirit of this invention and in Figure 3 is illustrated a modification wherein the pin 15 is eliminated and the upper end of the valve member extended above the piston head, as at 28, and guided in a tube 29, the bore of which communicates with the reservoir 5. The upper end of tube 29 is preferably provided with a rotatable cap or shield 30 adapted to normally close an inlet opening 31 communicating with the bore thereof. In this construction, when it is desired to use a forced feed, the gun or other lubricating device is provided with a tapered end which is inserted in the opening 31, or, if desired, the reservoir may be filled to capacity by use of an oil can or other device and the lubricant supplied the bearing only when the valve member is vertically, reciprocated, due to vibration.

The lubricating device shown and described is more particularly designed for use with automotive vehicles, aeroplanes and other devices having considerable vibration when in operation.

It will be readily obvious to those skilled in the art to which an invention of this character appertains that an automotive vehicle equipped with my device, while standing still will not drip or waste lubricant, due to the fact that the flow of lubricant from the reservoir to the bearings is disconnected; that, while in use, the bearings are properly lubricated, the lubricant being supplied the bearings due to the vibrations seating and unseating the weighted, reciprocally mounted valve. It will further be obvious that, by reason of the lower end of the valve member working in the sleeve, the return of the valve member to normal position operates as a plunger to force the lubricant which has entered bore 11 through the openings 14 through the outlet and when the same is raised is operated as a pump drawing lubricant from the reservoir into bore 11.

What I claim as my invention is:—

1. A device of the character described, comprising a lubricating reservoir, an outlet for the reservoir, a valve member normally closing said outlet, and means mounting said valve member whereby the same is free to move to and from closed position, whereby vertical vibration of the reservoir opens said outlet and permits lubricant to flow from the reservoir through the outlet, said means including a piston fixed with relation to the valve member and of a shape complementary to the cross section shape of the reservoir in which it has a snug but freely slidable fit.

2. A device of the character described, comprising a lubricant reservoir, an outlet leading from the reservoir, a valve member normally closing the outlet and having a stem extending upwardly through the reservoir, a piston carried by the valve stem, and means for guiding each end of said valve stem one of said guiding means forming an inlet for the lubricant.

3. A device of the character described, comprising a lubricant reservoir, an outlet leading from the reservoir, a valve member normally closing the outlet and having a stem extending upwardly through the reservoir, a piston carried by the valve stem, means for guiding each end of said valve stem, and means for introducing lubricant into the reservoir through the valve stem.

4. A device of the character described, comprising a lubricant reservoir, an outlet for the reservoir, a valve member normally closing the outlet, a valve stem extending from the valve member, the upper portion of the valve stem being bored and having an aperture therein spaced from the lower end of the bore, and means for introducing lubricant into the upper end of the stem bore to be supplied to the lubricant reservoir therethrough, the space between said aperture and lower end of the valve stem bore providing a dirt trap in which foreign matter carried by the lubricant settles.

5. A device of the character described, comprising a cylinder providing a lubricant reservoir, an outlet leading from one end of the reservoir and having a valve seat surrounding the same, a valve member engageable with said seat to close the outlet, a stem extending upwardly from the valve member throughout substantially the length of the reservoir, means guiding the valve stem at the lower end thereof, means guiding the valve stem at the upper end thereof, means for introducing lubricant to the interior of the reservoir through the stem member, and a piston fixed to the upper end of the valve stem whereby vertical vibrations engage and disengage the valve member with its seat.

6. A device of the character described, comprising a lubricant reservoir, an outlet leading from the reservoir, a valve member normally closing the outlet and having a stem extending upwardly through the reservoir, a piston carried by the valve stem and having a snug but freely slidable fit in the reservoir, and means permitting introduction of lubricant to the reservoir under pressure at the under side of the piston, whereby the piston is raised by pressure upon filling of the reservoir a predetermined degree to free the valve member of the outlet.

7. A device of the character described, comprising a lubricant reservoir, an outlet for the reservoir, a valve member normally closing the outlet, a valve stem extending from the valve member and being longitudinally bored and having an aperture communicating the bore with the interior of the reservoir, a piston carried by the valve stem above the aperture, means guiding the valve stem at its lower end, means guiding the valve stem at its upper end, and means for introducing lubricant under pressure into the bore of the valve stem and through the aperture into the reservoir whereby the piston is raised by the filling of the reservoir to a predetermined degree to free the valve member of the outlet.

In testimony whereof I affix my signature.

ALFRED WILD.